Jan. 4, 1927.
I. M. CLARKE
1,613,382
STAND FOR FLOOR LAMPS, SMOKERS' STANDS, AND THE LIKE
Filed Dec. 31, 1924
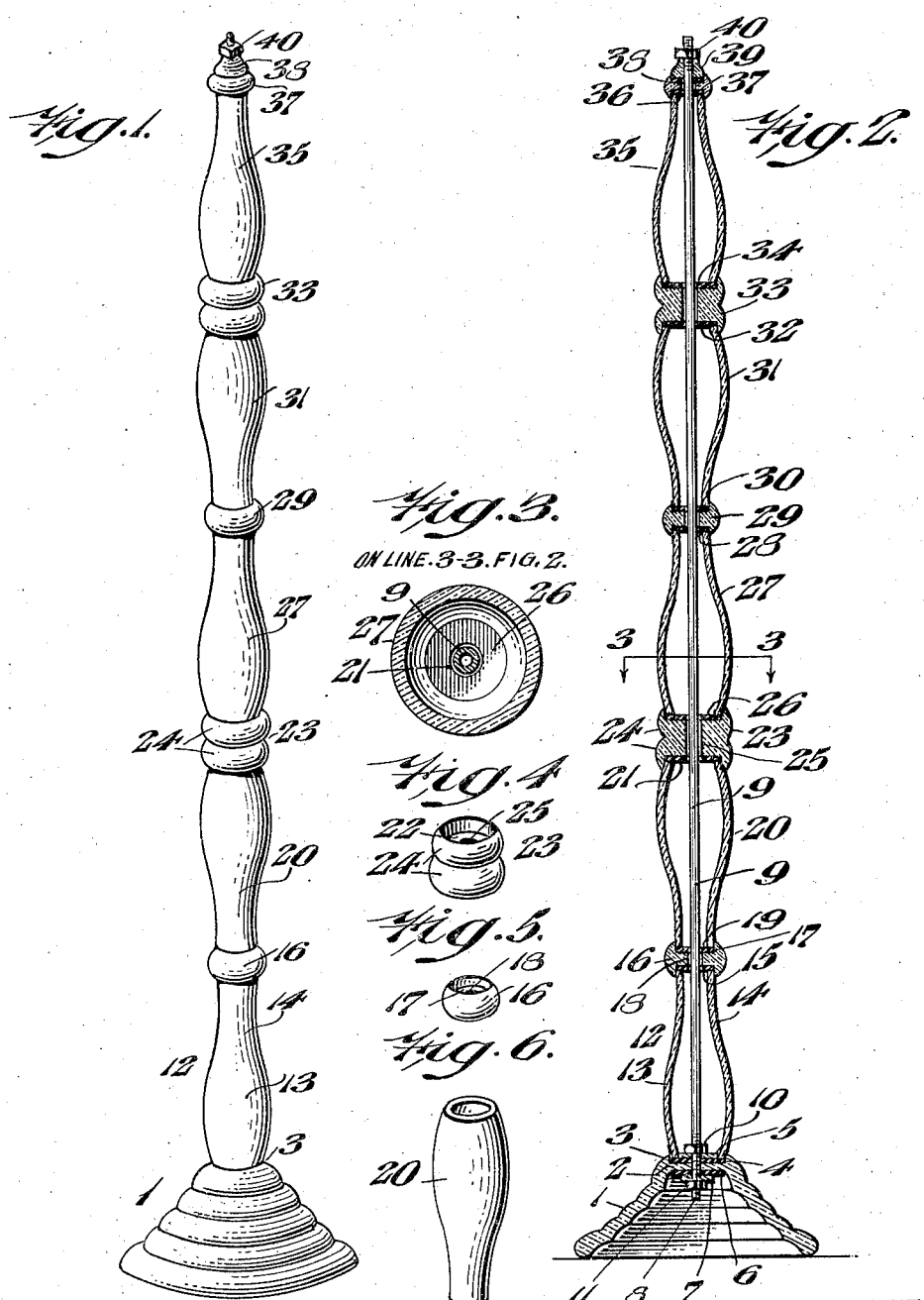
INVENTOR:
Ira M. Clarke.
BY
ATTORNEYS.

Patented Jan. 4, 1927.

1,613,382

UNITED STATES PATENT OFFICE.

IRA M. CLARKE, OF NEW MARTINSVILLE, WEST VIRGINIA.

STAND FOR FLOOR LAMPS, SMOKERS' STANDS, AND THE LIKE.

Application filed December 31, 1924. Serial No. 759,042.

My invention relates to a novel construction of a lamp stand comprising a base and pedestal members which are preferably composed entirely of glass and consists of a glass or other base, an upright centrally disposed centering tube or pipe secured thereon or clamped thereto and a series of blown glass sleeves and small and large pressed glass collars, which are alternated with the sleeves in a novel manner, the various blown glass sleeves as well as the intermediate collars and the lower sleeve being secured and assembled with respect to the base by novel means so that the finished product has a beautiful and attractive appearance, wherein the elongated blown sleeves and the intermediate smaller and larger pressed glass collars are separated by felt washers and held in assembled position, so as to appear as a unitary structure whereby a rigid, durable and attractive pedestal column or stand is produced, which is especially applicable for floor lamps, bridge lamps, smokers' stands and the like.

By my novel invention, wherein the blown glass sleeves and the pressed glass collars are made in duplicate or of standard sizes, I am enabled to produce a structure which can be readily assembled by unskilled labor and I am also enabled if desired to ship the elements comprising the pedestal or stand and its base in separate or knock-down condition if desired whereby the expense of crating, boxing and shipping is reduced to a minimum.

By my novel construction, I am further enabled to utilize the hollow centering tube, whereby the sleeves and collars are held in assembled position with respect to the base, as a container for the electric wires of the lighting appliances carried by the pedestal so that if desired the pedestal members can be shipped in knock-down condition and the pedestal and base members can be readily assembled so that the dealer or consignee can quickly and easily assemble the lamp in condition for immediate use.

A further object of my invention is to provide a base and pedestal of the novel character described, so that it will be composed of duplicate parts which can be manufactured and assembled at comparatively low cost.

To the above ends my invention consists of a novel construction of a base and pedestal member preferably composed of blown glass sleeves and pressed glass collars, the whole being held in assembled position by nuts or clamping devices on the ends of the centrally disposed tube or pipe, which is supported on the base.

For the purpose of illustrating my invention, I have shown in the accompanying drawings forms thereof, which are at present preferred by me, since they have been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a perspective view of a glass stand comprising novel base and pedestal members embodying my invention.

Figure 2 represents a vertical axial sectional view of Figure 1.

Figure 3 represents on an enlarged scale, a horizontal section on line 3—3, Figure 2.

Figures 4, 5 and 6 represent in detached position perspective views of the pressed glass collars and the blown glass sleeves respectively.

Similar numerals of reference indicate corresponding parts.

Referring to the drawings:—

In carrying out my invention, I construct the hollow base portion 1 preferably of glass which may fluted or provided with annular beads or other ornamentations, said base having a horizontal top wall 2 provided with a top seat 3, in which I place a disc of felt 4. On top of the felt disc I place an iron washer 5. Below the top wall 2, I place a felt disc 6, below which is an iron washer 7. The center of the top wall 2, and the felt discs and washers have aligning holes therethrough and when the parts are assembled as seen at the lower portion of Figure 2, the lower threaded end 8 of the pipe or tube 9 having the upper lock nut 10 thereon, is positioned as seen in Figure 2, and the bottom lock nut 11 is then tightened against the washer 7.

The base 1 and the centering tube 9 having thus been assembled, the other elements comprising the blown glass sleeves and the pressed glass collars of varying thickness can now be readily and expeditiously strung or assembled into place.

I first place in position the lower blown glass sleeve 12, which is hollow and open at both ends and has a lower bulging convex portion 13 and an upper convex narrower portion 14, said member having generally somewhat of the contour of an Indian club, and its lower end fitting nicely over the iron washer 5, and resting on the felt disc 4. Upon the upper smaller end of the sleeve 12 I place the felt disc 15 and then place thereon the narrow pressed glass collar 16 having a single bead or annular convex surface, said collar having the oppositely located seats 17 and the central hole 18 therethrough, through which latter passes the centering tube 9. Upon the upper seat 17 of the lower collar last referred to I place a felt disc 19, and on the latter I place the lower smaller end of the second blown glass sleeve 20 which is of the same dimensions and contour as the lower blown glass sleeve 12, this second glass sleeve being however inverted. Upon the upper larger end of the second sleeve 20, I place a felt disc 21, and superimpose thereon the bottom seat 22 of the larger pressed glass collar 23 having the double beads 24 and the central hole 25. Upon the upper seat of the larger pressed glass collar 23 I place the felt disc 26 upon which is placed the larger end of the third blown glass sleeve 27, which is positioned in the same manner as the lower blown glass sleeve 12. Above the sleeve 27 come in order the felt discs 28, the smaller pressed collar 29, the upper felt disc 30, the fourth blown glass sleeve 31, the felt disc 32 the large pressed glass collar 33, the felt disc 34, and the upper blown glass sleeve 35. On the top of the latter is the felt disc 36, above which is the collar 37 above which is the felt disc 38, upon which is the upper nut 39, surmounted by the lock nut 40, which is in threaded engagement with the upper end of the pipe or tube 9. By the above described arrangement and combination of parts I attain a novel, useful and ornamental appearing article. Because of the fact that glass is employed throughout it is not necessary to provide numerous color schemes as in the case of wood since the glass readily blends with most any other article in a room being furnished. Obviously, however, if desired the glass may be of any desired tint or color. Another advantage resides in the fact that the stand may be shipped in knockdown condition and readily assembled thus saving space in shipment.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim as new and desire to secure by Letters Patent, is:—

1. In a stand of the character stated, a hollow substantially frustum shaped base having a recessed and apertured top, an apertured disc of pliable material fitted to said recessed top, a hollow elongated lower sleeve of substantially Indian club shape and having its larger end seated upon said disc, a similar hollow sleeve but reversely arranged, superimposed upon the first mentioned lower sleeve in spaced relation thereto, a collar having upper and lower dished portions positioned between the juxtaposed ends of said lower pair of sleeves, apertured discs of pliable material fitted to each upper and lower dished portion of said collar, similar sleeves and collars arranged in axial alignment to complete the stand, said sleeves being arranged in pairs, an upper and lower pair having their smaller ends juxtaposed to the intermediate contacting collar, and the upper sleeve of the lower pair and the lower sleeve of the upper pair having their larger ends juxtaposed to the intermediate contacting collar, a tie rod passing through said base, sleeves and collars, a nut within said lower sleeve above said base and a nut within said base and below its top for securing the lower sleeve and base with respect to said tie-rod and fastening means common to the upper end of said tie-rod and the upper hollow sleeve.

2. In a stand of the character stated, a hollow, substantially frustum shaped base having a recessed and apertured top, an apertured disc of pliable material fitted to said recessed top, a hollow elongated lower sleeve of substantially Indian club shape and composed of blown glass having its larger end seated upon said disc, a similar hollow blown glass sleeve but reversely arranged, superimposed upon the first mentioned sleeve in spaced relation thereto, a collar of pressed glass of solid cross section having upper and lower dished portions positioned between the smaller juxtaposed ends of said sleeve, apertured discs of pliable material fitted to each upper and lower dished portion of said collar, similar hollow blown glass sleeves and pressed glass collars arranged in axial alignment to complete the stand, said sleeves being arranged in pairs, the upper and lower pairs having their smaller ends juxtaposed to the intermediate contacting collar, and the upper sleeve of a lower pair and the lower sleeve of the superimposed upper pair having their larger ends juxtaposed to the intermediate contacting collar, a collar on the upper larger end of the upper sleeve of said upper pair, a sleeve superimposed on said collar, a tie-rod passing through said base, sleeves and collars, a nut within said lower sleeve above said base and a nut within said base, and below its top for securing the lower sleeve and base with respect to said tie-rod and fastening means common to the upper end of said tie-rod and said upper hollow sleeve.

In testimony whereof, I have hereunto signed my name.

IRA M. CLARKE.